Nov. 22, 1932.  W. F. CLARK  1,888,620
SOLAR HEATER
Filed May 7, 1927
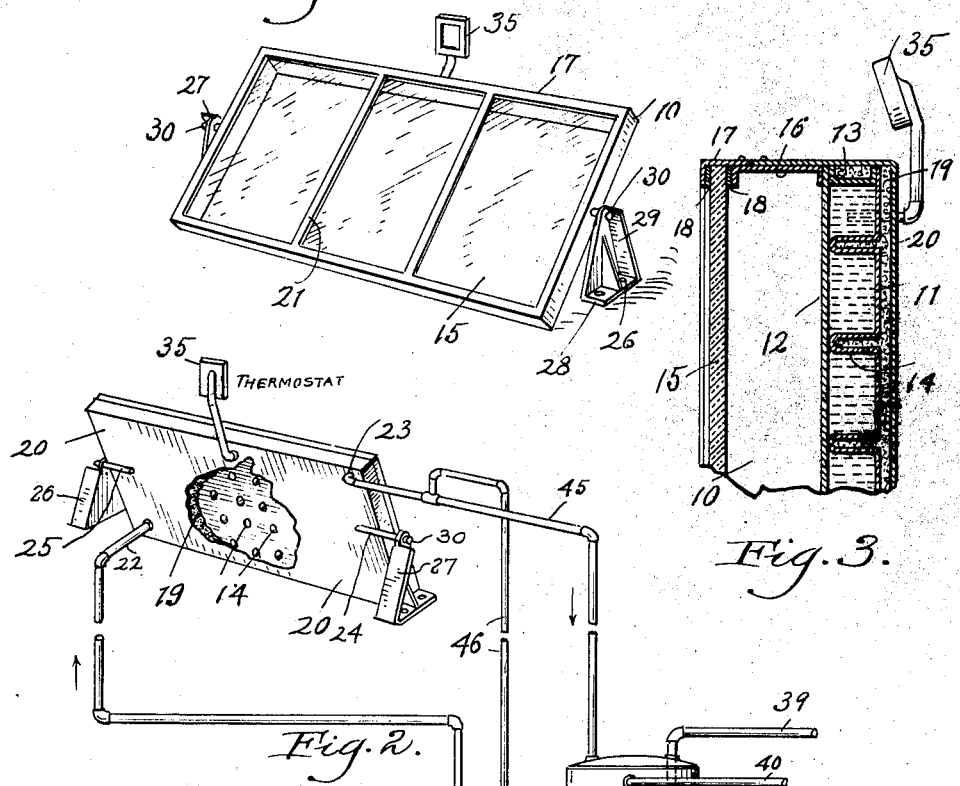
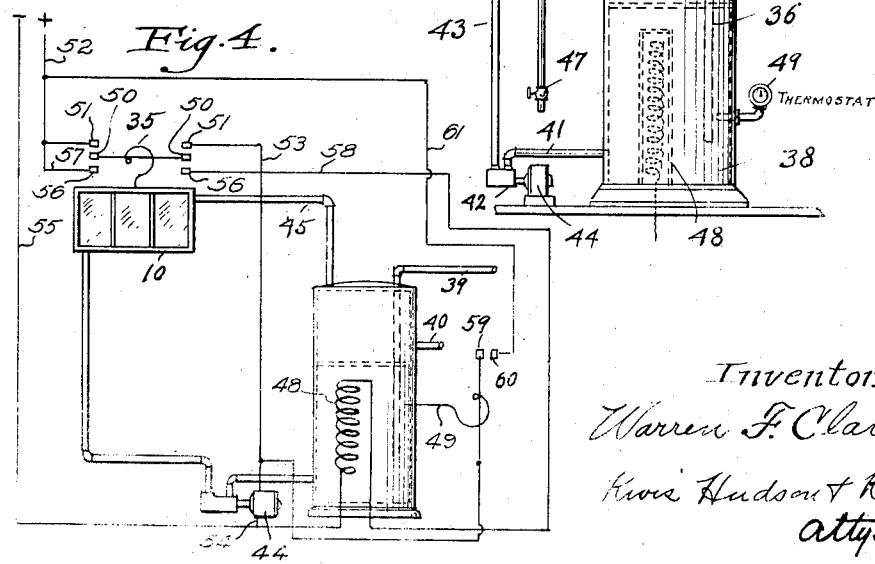
Inventor:
Warren F. Clark
Kwis Hudson & Kent
attys.

Patented Nov. 22, 1932

1,888,620

UNITED STATES PATENT OFFICE

WARREN F. CLARK, OF PHILADELPHIA, PENNSYLVANIA, ASSIGNOR TO AUTOMATIC ELECTRIC HEATER COMPANY, OF POTTSTOWN, PENNSYLVANIA, A CORPORATION OF DELAWARE

SOLAR HEATER

Application filed May 7, 1927. Serial No. 189,608.

This invention relates to a fluid heating device and more particularly to a solar heater whereby a quantity of water contained within the heater is exposed to the rays of the sun for a period of time during which the temperature of the water is materially raised.

The heater is especially adapted for use in sections of the country having a torrid climate but good results are obtained elsewhere.

It is a further object of the invention to construct a heater of the type indicated which is simple and inexpensive to manufacture and exceptionally efficient in operation.

A further object of the invention is to provide a system for supplying water to the heater to be therein heated by the sun's rays and when heated to a predetermined temperature cause the heated water to be withdrawn from the heater and stored in a suitable receptacle for future use.

The invention further contemplates replenishing the heater with cold water simultaneously as the heated water is withdrawn and to then subject the cold water delivered to the heater to the sun's rays to materially raise the temperature thereof as before explained.

Another object of the invention is to provide independent means for heating the water at times when the sun's rays are unavailable or when there is a considerable drain upon the heated water in the supply receptacle.

Another object of the invention is to automatically control the supply of cold water to the heater so that the cold water will not be introduced into the heater until the temperature of the water being heated within the heater has been raised to a predetermined degree.

Another object of the invention is to provide automatic means whereby at times when the sun is not shining and the temperature of the water within the heater drops to a predetermined degree, a heating element will be actuated to sufficiently heat the water and maintain sufficient heated water within the heated water supply receptacle or tank.

A further object of the invention is to provide a system in combination with the solar heater whereby the operation of the system is fully automatic so the attention of persons is eliminated.

With the objects above indicated and other objects hereinafter explained in view, my invention consists in the construction and combination of elements hereinafter described and claimed.

Referring to the drawing:

Fig. 1 is a perspective view of the solar heater and the means for supporting the same.

Fig. 2 is a diagrammatic view of the system employed and showing the rear view of the solar heater in perspective with portions broken away.

Fig. 3 is an elevational cross-sectional view of the heater, and

Fig. 4 is a wiring diagram showing the means for automatically controlling the system.

In the drawing, 10 represents generally a solar heater which may be constructed in any desirable manner so long as the objects above indicated are obtained, but preferably as illustrated in the drawing.

This solar heater comprises a hollow rectangular water heating device of suitable dimensions and consists primarily of a back plate 11 and a heat-transmitting front plate 12 of copper or other suitable material, which plates are connected together by a channel-shaped member 13 extending entirely around the outer edge of the plates to form a water-tight chamber. This chamber may be of any desired capacity and is adapted to receive the water to be heated by the rays of the sun.

To further facilitate the heating of the water within the water chamber, the back plate 11 is provided with a plurality of projections 14, preferably stamped from the back portion thereof, and which extend inwardly into engagement with the inner surface of the copper plate 12. These projections 14 may be connected to the plate 12 by spot welding or other suitable means.

The solar heater is provided with a glass cover 15, forming the outer wall thereof, and is spaced from the copper plate 12 by a channel-shaped member 16, which is spot welded or otherwise suitably secured to the plate 12. A pair of felt washers 18 are disposed on opposite sides of the glass cover 15 and the latter is maintained in engagement with one leg of the channel member 16 by means of a clamping frame 17, bolted or otherwise secured to the outer surface of the channel-shaped member 16.

It will be noted that this construction provides a suitable air space between the copper plate 12 and the glass 15 for the purpose of preventing the heat within the copper plate and water from passing off rapidly when the sun sets, but, if desired, the glass cover may be omitted.

To maintain the heat within the solar heater and within the water compartment insulation 19 is applied to the outer surface of the back plate 11 and around the channel member 13, and this insulation is maintained in place by means of a cover member 20 which entirely surrounds the outer and back surfaces of the water chamber and is secured by bolts or other suitable means to the channel member 16 adjacent the clamping frame member 17. This arrangement provides a water chamber insulated around the sides and back portion thereof and provided with an enclosed air space adjacent the front thereof. As the glass 15 is of considerable size it is desirable to provide transverse reinforcing rods 21 spaced at intervals along the length of the glass, as clearly shown in Fig. 1, which may be attached to the frame 17 by bolts or formed integral therewith.

It will be noted from the construction so far described that a hollow heater has been provided, which heater is adapted to contain a suitable quantity of water, adapted to be heated by subjecting the latter to the sun's rays for a predetermined period of time.

The back plate 11 is provided with an inlet opening 22 at its lower portion, adapted to permit cold water to be supplied to the heater and an outlet opening 23, at its upper portion, adapted to permit the heated water to be withdrawn from the heater.

Upon the rear portion of the back plate 11 is a pair of oppositely disposed rods 24 and 25, welded or otherwise secured thereto, the outer ends of the rods being screw-threaded and journaled in supporting brackets 26 and 27. These brackets are each provided with flanges 28 and 29 adapted to rest upon a suitable foundation, the proper supporting flange being selected depending upon the position in which the heater is supported. Adjusting nuts 30 are positioned upon opposite sides of the brackets 26 and 27 and are adapted to be turned into engagement with both sides thereof so as to securely maintain the heater in the desired position, it being desirable to adjust the heater so that the rays of the sun will be directed most efficiently through the glass 15 and into contact with the copper plate 12 for heating the water within the water chamber. An opening is provided in the upper portion of the heater and has mounted therein an arm of a thermostat 35, the purpose of which will be hereinafter described.

While I have described the preferred construction of the solar heater it should be understood that changes and modifications may be made without departing from the spirit of the invention, the particular object of the invention being to provide a solar heater having an unobstructed chamber therein adapted to contain a quantity of water to be heated by exposure to the sun's rays.

The system about to be described in combination with the solar heater is found to be very efficient and practicable, and the operation of the solar heater is briefly as follows:

Cold water is introduced into the solar heater until the water compartment is completely filled and the glass cover 15 and the heater plate 12 of the heater, are adjusted so as to be in a direct line with the sun's rays. The water is thus subjected to the rays of the sun until the temperature thereof is raised to a predetermined degree, at which time the heated water is withdrawn from the solar heater and delivered to a suitable supply receptacle and the heater is supplied with fresh cold water. The operation is continued as before described so long as it is desired to obtain hot water.

Referring particularly to Fig. 2, a boiler 36 is suitably supported at a location remote from the solar heater. This boiler is divided into two communicating chambers, the upper chamber 37 being provided for the purpose of receiving the heated water and to maintain the same for future use while the lower chamber 38 is adapted to receive cold water delivered thereto from the cold water supply line 39. The upper portion of the chamber 37 is provided with an outlet pipe 40 which may be connected to any suitable discharging means. The lower portion of the cold water chamber 38 is provided with an outlet pipe 41 which is connected to a suitable water pump 42 of any desirable construction. The pump 42 is actuated by a motor 44. The motor 44 will actuate the pump to produce a flow of water from the cold water chamber 38 of the boiler 36 through the pipe 41, through the pump 42, through the pipe 43 to the inlet opening of the solar heater, thence through the heater, discharging the water through the outlet opening 23, through pipe 45, and into the upper chamber 37 of the boiler 36 from where the water may be drawn off as required through the outlet pipe 40. An air bleeder pipe 46 is connected to the pipe 45 adjacent the outlet opening 23 of the solar heater and extends down to a position adjacent the boiler 36, the lower end being provided with a manually operated valve 47.

The means for controlling the operation of the motor 44 will be later described but it here suffices to say that this motor is actuated periodically and controlled by the thermostat 35 so that the water to be heated within the solar heater is permitted to remain for a predetermined period of time sufficient to raise the temperature of the water to a suitable degree.

It sometimes happens that the sun's rays are not available, due to cloudy days, for example, and under such circumstances an independent means is provided for heating the water which consists in an electrically heated element 48 positioned within the cold water chamber 38 of the boiler 36 and suitably connected in an electrical circuit. When this electrically heated element 48 is employed the temperature of the water is controlled by a thermostat 49 secured to the lower portion of the boiler 36 and extending inwardly within the cold water chamber 38. It has been found desirable to employ this electrically heated element 48 on occasions when the sun's rays are unavailable for heating the water within the solar heater and at times when the drain upon the hot water supply receptacle is in excess of the quantity of water being supplied by the solar heater. The thermostat 49 is also electrically connected with the motor 44 and controls the operation thereof when the electrically heated element 48 is employed.

In Fig. 4 I have shown the wiring diagram employed in the automatic operation of the system. It might be here stated that the thermostats 35 and 49 are of a type employing the Bourdon tube and adapted to contain a suitable heat responsive medium, the heating of which tends to expand the Bourdon tube and the cooling of which tends to contract the same.

It is desirable to raise the temperature of the cold water supplied to the solar heater 10 to substantially 140° F. and this may be done by exposing or subjecting the water within the heater to the sun's rays for a period of substantially four hours. During the heating of this water the motor should remain idle but when the temperature of the heated water reaches approximately 140° F. the motor should be started, thereby actuating the pump 42 which draws cold water from the cold water chamber 38 and forces the same upwardly through the inlet opening of the solar heater 10. This causes the heated water to flow out through the discharge opening 23 and into the hot water chamber 37 in the upper portion of the boiler 36. The operation of the motor 44 is controlled by the thermostat 35, the Bourdon tube of which is provided with a pair of movable contact members 50. When the temperature of the water rises to substantially 140° F. the contact members 50 are carried upwardly, due to the expansion of the tube, into engagement with the contacts 51, one of said contacts being connected to the main line 52 while the other of said contacts is connected by a wire 53 to one terminal of the motor. The other terminal of the motor is connected by the wire 54 to the other main line 55. When the heated water within the solar heater 10 has been withdrawn and replaced by cold water the reduction in temperature contracts the Bourdon tube of the thermostat 35 and breaks the contact between the contact members 50 and 51, thereby stopping the operation of the motor and the flow of cold water to the solar heater. This cold water within the heater is then subjected to the sun's rays for a similar period of time or until the temperature has been raised to substantially 140°, at which time the contacts 50 and 51 are again closed thereby starting the motor. This operation is continued with each change of water within the solar heater 10.

At times when it is desired to employ the heating element 48 this heating element is automatically controlled by the temperature within the solar heater 10. When the temperature of the water within the solar heater falls to substantially 100° the contracting of the Bourdon tube of the thermostat 35 causes the contacts 50 to engage with the contacts 56. One of the contacts 56 is connected by wire 57 to the main line 52 while the opposite contact is connected by a wire 58 to one end of the heating element 48. The opposite end of the heating element 48 is connected to the opposite main line 55. When the temperature of the water within the solar heater 10 drops to 100° or less the contracting of the Bourdon tube causes the contact members 50 to engage with the contact members 56, thereby closing the circuit to the heater 48. This causes the water within the cold water chamber 38 to be heated and the temperature of this water is controlled by the thermostat 49 on the side of the boiler 36. This thermostat 49, as before stated, also controls the operation of the motor 44 independently of the thermostat 35. The end of the Bourdon tube carries a pivoted contact member 59 which is connected to the wire 53 leading to the motor while an adjacent contact member 60 is connected by a wire 61 to the main line 52. When the temperature of the water within the cold water chamber 38 rises to approximately 130°, the thermostat having been adjusted for this temperature causes the contacts 59 and 60 to close thereby closing the circuit to the motor. The motor then actuates the pump 42 to withdraw the heated water within the chamber 38 and forces the same into the solar heater 10, the entrance of this water into the solar heater forces the water within the solar heater into the hot water supply receptacle 37. The operation of the motor 44 continues until the water delivered to the solar heater 10 drops to 100° F. or below, at which time the contacts 50 and 56 are closed and the heating element 48 is again started. During the withdrawing of the heated water from the chamber 38 fresh cold water has been supplied by means of the main water supply line 39 and the temperature of the water having materially dropped causes the contacts 59 and 60 to be disengaged thereby breaking the circuit to the motor and stopping the flow of water to the solar heater 10. This cycle of operations continues automatically as long as the system is in operation.

While I have described the preferred arrangement of the system it is to be understood that I am not limited to the specific operation thereof, and modifications may be resorted to without deviating from the spirit of the invention as contained in the appended claims.

Having thus described my invention what I claim is:

1. In a solar heater, a hollow frame having a back plate, said back plate having hollow projections provided thereon, a heat transmitting plate secured to said frame and engaging said projections to form with said back plate and frame a water chamber, insulation for said back plate extending into said projections, an inlet for supplying water to said water chamber, and an outlet through which the heated water is drawn off.

2. In a solar heater, a hollow frame having a back plate, said back plate having projections pressed therefrom, a heat transmitting plate secured to said frame and said projections to form with said back plate and frame a water chamber, an inlet for supplying water to said water chamber, and an outlet through which the heated water is drawn off.

3. In a solar heater, a hollow frame having a back plate, said back plate having tubular projections pressed therefrom, a heat transmitting plate secured to said frame and cooperating with said projections to form with said back plate and frame a water chamber, an inlet for supplying water to said water chamber, and an outlet through which the heated water is drawn off.

In testimony whereof, I hereunto affix my signature.

WARREN F. CLARK.